United States Patent Office 3,039,123
Patented June 19, 1962

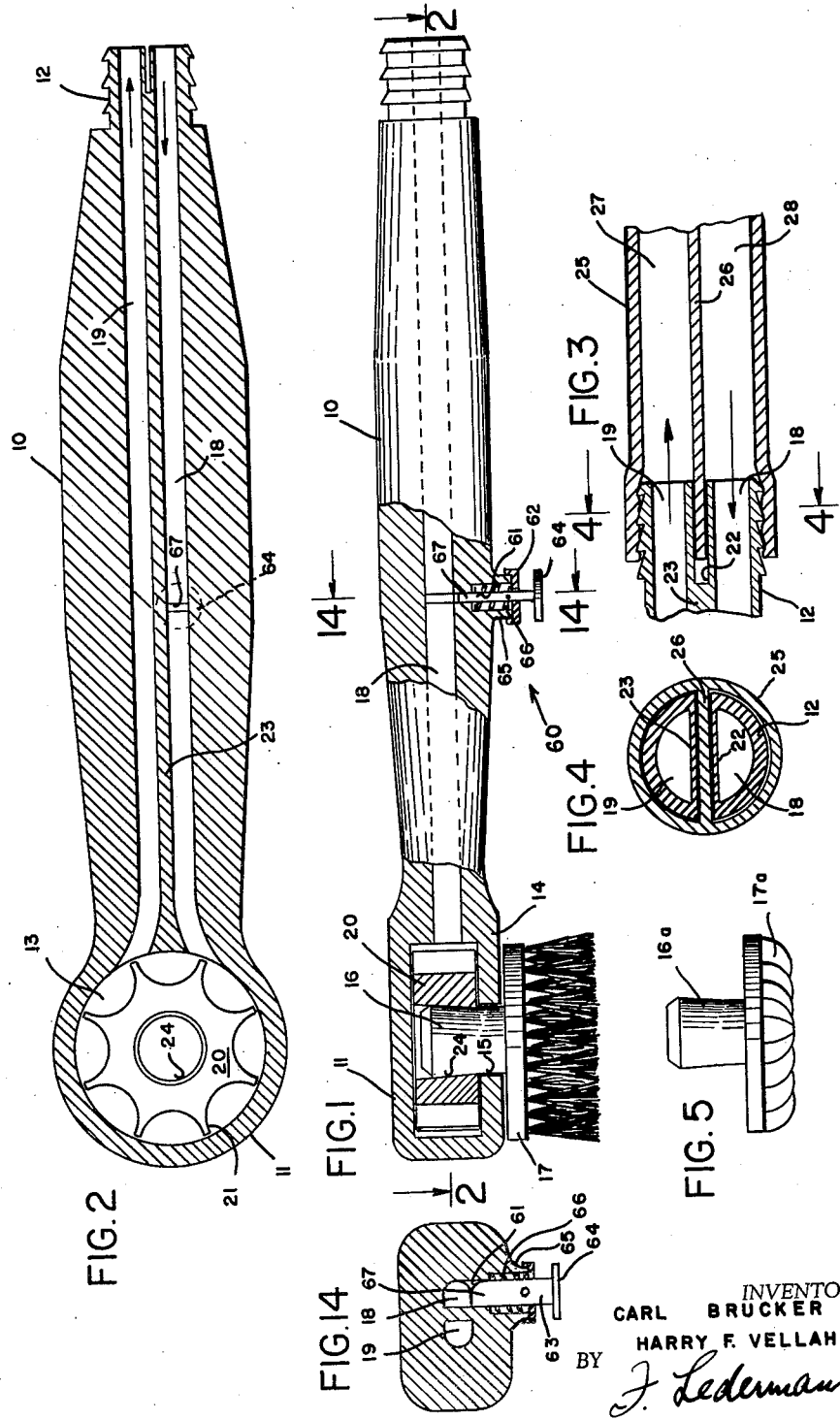

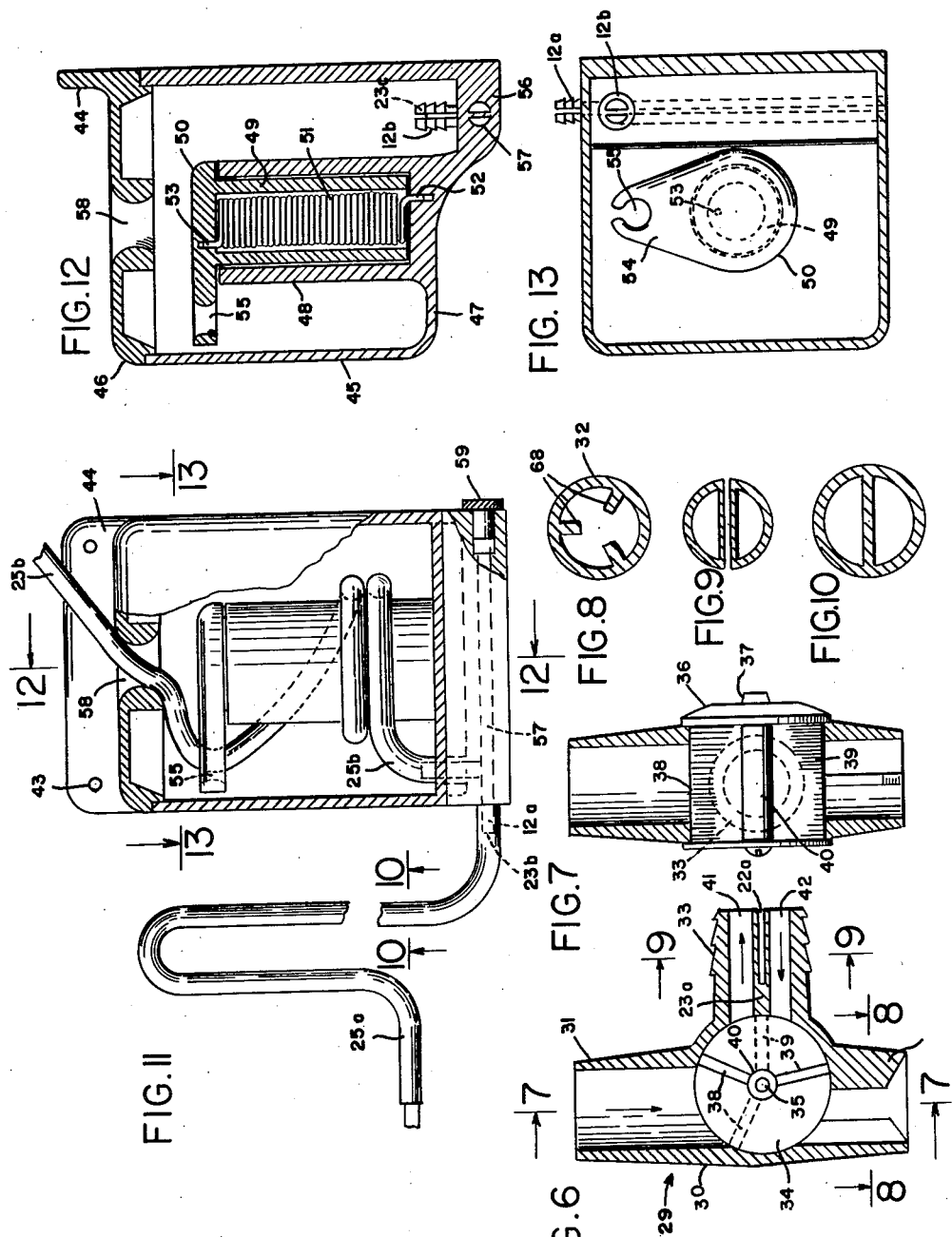

3,039,123
WATER POWERED TOOTHBRUSH, MASSAGER
OR THE LIKE
Carl Brucker, Brooklyn, N.Y. (153—25 88th St., Howard Beach, N.Y.), and Harry F. Vellahn, 1716 Norman St., Ridgewood, N.Y.
Filed Sept. 27, 1961, Ser. No. 141,069
3 Claims. (Cl. 15—28)

This invention relates to water power rotary brushes such as, by way of example, tooth brushes or massage brushes or rotors, and a primary object of the invention is the provision of a practical, novel and efficient rotor in the form of a brush or massager at the end of a handle or like holder provided with means for the inward flow of water to rotate the rotor and an outward flow of the spent water, together with a novel hose connecting the water tap with the device as well as a novel valve for conducting in inflowing and exiting water in the desired manner.

Another object of the invention is the provision of a wall receptacle adapted to be attached to the bath room or a cabinet wall, having the hose from the water tap lead thereinto and provided with a spring loaded spool on which a hose leading to the handle or holder of the device is adapted to be automatically wound when tension on the hose is released. Further, the said wall receptacle may be provided with a through but normally plugged water conduit to which a second hose may be attached leading into a second similar wall attachment. In this way two persons may use similar toothbrushes or massagers at the same time. Additional similar wall devices may obviously be connected in series, each provided with one of the water power rotary brushes.

A still further object of the invention is the provision of the various hoses referred to in the form of double conduits, having an internal wall dividing the hose into two separate passages so that one passage may conduct inflowing water into the device and the other passage may conduct exiting water.

The above as well as additional objects will be clarified in the following description wherein reference numerals refer to like-numbered parts on the accompanying drawings. It is to be noted that the drawings are intended primarily for the purpose of illustration and that it is therefore neither desired nor intended to limit the invention necessarily to any or all of the exact details shown or described except insofar as they may be deemed essential to the invention.

Referring briefly to the drawing, FIG. 1 is a side elevational view of a water power tooth brush embodying features of the present invention, with parts broken away and partly in section.

FIG. 2 is a sectional view taken on the line 2—2 of FIG. 1.

FIG. 3 is a fragmentary enlargement of FIG. 2 and additionally shows fragmentarily the novel hose of the device attached to the tail end of the handle or holder.

FIG. 4 is a sectional view taken on the line 4—4 of FIG. 3.

FIG. 5 is a side elevational view of a rotary massager which is insertible into the rotor of the device in place of the rotary brush shown in FIG. 1.

FIG. 6 is a cross-sectional view of a T-connector or coupling, including a novel valve, which is used to connect the device to a water tap.

FIG. 7 is a sectional view taken on the line 7—7 of FIG. 6.

FIG. 8 is a sectional view taken on the line 8—8 of FIG. 6.

FIG. 9 is a sectional view taken on the line 9—9 of FIG. 6.

FIG. 10 is a sectional view taken on the line 10—10 of FIG. 11.

FIG. 11 is a front elevational view, with parts broken away and partly in section, of a wall receptacle which may be used with the device.

FIG. 12 is a sectional view taken on the line 12—12 of FIG. 11.

FIG. 13 is a sectional view taken on the line 13—13 of FIG. 11.

FIG. 14 is a sectional view taken on the line 14—14 of FIG. 1.

Referring in detail to the drawings, the numeral 10 indicates a holder or handle or elongated body which in general is equivalent to the handle of a tooth brush. A circular head 11 is provided on one end of the body 10, and a reduced nipple 12 is provided on the tail end thereof.

The head 11 is hollow and encloses a cylindrical compartment 13 having in its bottom wall 14 an axial opening 15. Rotatably mounted in the chamber 13 is a rotor 20 provided with an axial opening 24 and having circumferentially spaced buckets or fins 21, the specific form or structure of the rotor in this respect being immaterial. Within the body 10 two longitudinal passages 18 and 19 extend the length thereof, being divided by a wall 23 which is shown positioned in a plane through the axis of the rotor. The passages diverge somewhat at their ends where they communicate with the chamber 13.

A rotary tooth brush 17 has a stub shaft or stem 16 adapted to pass through the opening 15 and register frictionally in the opening 24 in the rotor. Alternatively, a rotary massager 17a may have its stem 16a likewise registered in the rotor opening. Suitable friction engagement may be provided by making the shafts 16 and 16a of a yieldable material such as, for example, rubber or a resilient plastic.

At its outer extremity, within the nipple 12, the wall 23 is split to provide a slot 22 therein. Further, the nipple for the length of the slot is divided by the slot, or split into two sections which constitute continuations of the passages 18, 19.

A dual passage flexible hose is provided, as shown at 25, having a diametrical wall 26 dividing the interior into two separate passages 27 and 28. In attaching this hose to the nipple 12, as shown in FIG. 3 and FIG. 4, the cylindrical wall of the hose resiliently engages the nipple and the wall 26 registers in the slot 22.

FIG. 6 shows a T-connector or coupling for connecting the dual hose 25, not shown in FIG. 6, to a water tap, not shown. The connector 29 includes a tubular body 30 of which the end 31 is adapted to be engaged about the water tap and the end 32 serves as an exit for waste water into the basin or sink, for which purpose the connector 30 is preferably positioned upright with the end 31 at the top. At right angles to and approximately intermediate the tube 30 a nipple 33 communicates with the tube through the medium of a cylindrical valve chamber. In this chamber a stem 35 is rotatably mounted, having on one end a cap 36 provided with a finger grip 37. Two diametrical wings 38 and 39 extend from a sleeve 40 rigid on the stem 35 at an obtuse angle to each other, substantially as shown. When the valve wings 38 and 39 are in the positions shown in full lines in FIG. 6, inlet water flowing into the end 31 will flow out into the basin through the end 32. When the wings are in the positions shown in broken lines, the incoming water will be diverted into the passage 41, through the passage 26 of the hose 25 which it is assumed is connected to the nipple 33, through the passage 18 of the body 10, and back through the passages 19, 28 and 42 and thence out through the end 32. The nipple 33 is provided with a dividing wall 23a similar to the wall 23 and this wall 23a is provided with a slot 22a similar to the slot 22.

The device as thus far described sets forth the simple utilization of the water power tooth brush or massager. Of course tooth powder or paste will be applied to the brush as desired for brushing the teeth.

FIGS. 11 to 13 show the wall receptacle which may, either singly or in multiple, be permanently mounted in the bath room by means of screws, not shown, passed through holes 43 in the receptacle. The receptacle constitutes a housing 45 provided with a roof or cover 46. Extending upward from the floor 47 is a cylindrical shell 48, open at the top. Registering rotatably within the shell 48 is a hollow cylinder 49 provided with a cap 50 on its upper end. A coiled spring 51 is mounted within the cylinder 49, having one end 52 anchored in the floor 27 and the other end 53 anchored in the cap 50 so that the spring normally restores the cylinder to its original position, or rather tends to so restore it, after the cylinder has been rotated. The cap 50 has a radial extension 54 provided with a split opening 55 therethrough.

The rear end of the floor 44 is depressed as at 56 and a pipe 57 passes therethrough transversely to the receptacle. From one end of the pipe 57 a split nipple with a dividing wall, shown respectively at 12a and 23b, projects. A hose 25a, identical to the dual passage hose 25, is attached about the nipple 12a in the manner previously described, the other end of the hose being attached to the water tap as previously also described. Within the receptacle a split nipple 12b with a dividing wall 23c rises from the pipe 57, and to this a dual passage hose 25b is attached in the same manner. With the spring 51 partly wound up or tensed, the hose 25b is wound around the shell 48 and its other end is passed through the opening 55 and thence through an opening 58 in the roof 46, the free end of the hose 25b being attached (not shown) to the nipple 12 of the body 10 in the manner shown in FIG. 3 for the hose 25.

FIG. 11 is intended to show the hose 25b pulled partly out of the receptacle through the roof opening 58, it being assumed that the body 10 is connected to the free end of the hose. This is substantially the position of the various parts of the device when the brush or massager is to be used. In pulling the hose out through the opening 58 it is apparent that the cap 50 and hence the cylinder 40 will be turned to wind up the spring 51, owing to the eccentricity of the opening 55 through which the hose extends. Upon release of the body 10 the spring 51 will automatically cause rewinding of the hose upon the shell 48 so that all or most of the hose will disappear into the receptacle and only the body 10 including the head 11 will remain outside.

In case a second receptacle identical to that of FIGS. 11–13 is desired so that a second person may use a similar rotary brush or massager at the same time, it may be connected in series with the pipe 57. Normally this pipe is closed at its far end by a suitable plug 59, and upon removal of the plug the pipe may be connected to the second receptacle by a hose similar to the hose 25.

In order for the user to be able to control the flow of water through the body 10, either to start or stop the flow or to control the speed of flow and hence the speed of rotation of the rotor, a spring loaded normally closed push button valve is provided on the body 10, preferably on the underside thereof. This valve is indicated at 60 in FIG. 1, and it is mounted in the inflow passage 18 although it might of course be mounted in the passage 19. For convenience in manufacture of the device, the body 10 including the head 11 is preferably made of two parts, not shown, with one part being that above the section line 2—2 in FIG. 1 and the other part being that below the said section line. Since this feature does not comprise an element of the invention, however, it is not deemed necessary to illustrate it as it would be obvious to anyone skilled in the art.

A passage 61 is provided vertically upward through the bottom wall of the body 10, terminating in the water passage 18. The lower end of this passage is reduced by a shoulder or cap 62. A stem 63 is slidably mounted in the reduced portion of the passage and provided with a head 64, in the fashion of a button. A boss 65 surrounds the lower end of the passage 61, and a coiled spring 66 confined within the boss, which is annular, and surrounding the stem normally urges the stem downward. At its inner end the stem is enlarged and shaped into a shutter 67 of the same outline as the cross-sectional outline of the passage 18, FIG. 14. The passage 18 is shown in the normal open position in FIG. 14, with the shutter 67 kept clear of the passage by the spring 66. FIG. 1 shows the button 64 depressed to register the shutter 67 in the passage 18 and thus block the same. The button may thus be worked by a finger of the hand holding the holder 10, either to close the passage when finished with the device or to open it to varying degrees to vary the speed of the rotor. When finished with the device the water may be turned off at the tap and the holder released so that the hose may be wound up on the shell 48 as previously described.

FIG. 8 shows the discharge end of the coupling 29 provided with inwardly directed fins 68 which tend to disperse the exiting water into the basin to avoid splashing.

Since the device as set forth is useful either as a tooth brush or a massager, as well as for other purposes, any such attachment which is secured in the rotor opening 24 may be termed an applicator.

It is to be noted that, in reference to utilization of the self-winding device in the receptacle shown in FIGS. 11–13, there is a unitary conduit, or dual passage conduit, extending from the coupling 29 to the body nipple 12, with the end portions 25a, 25b, FIG. 11 consisting of flexible hoses and the portion or pipe 57 being fixedly retained in the receptacle.

The invention having thus been described, what is claimed and desired to be secured by Letters Patent is as follows:

1. In combination, a water powered device of the class described consisting of an elongated member including a body portion, a generally cylindrical hollow head on one end of the body portion provided with a roof and a floor, a nipple on the other end of the body portion, the body portion and the nipple having two spaced longitudinal passages extending therethrough and communicating with said head, the head having a water wheel rotor mounted therein including radial fins having a relative spacing with respect to said passages whereby water entering the head from one of said passages rotates the rotor and exits through the other of said passages, said floor and said rotor having aligned axial openings, a rotary applicator having a stem extending through the floor opening and registering securely in said rotor opening, said body portion and said nipple including a continuous longitudinal wall between said passages separating the passages from each other and lying in a plane through the axis of the rotor, the end portion of said wall within said nipple having a slot therein extending thereinto from the outer end thereof and lying in said plane, an elongated conduit having at least the portions thereof at the two ends thereof made of flexible material, the conduit including a diametrical wall extending throughout the length thereof, one end of the conduit being secured about said nipple and having the corresponding end of the conduit wall registering in said slot, a T-coupling including a tubular portion and a nipple at substantially right angles thereto between the ends thereof, the coupling nipple having a diametrical wall therein dividing the nipple into two spaced passages, said last-named wall having a slot therein extending thereinto from the outer end thereof and lying in the plane thereof, one end of said tubular portion being adapted to be connected to a water tap, the coupling having means therein for diverting inlet water from the tap into one of said coupling nipple passages and providing free flow of water from the other of the coupling nipple passages into the other end of said tubular portion, the other end of said conduit being secured about said coupling nipple with the other end of said conduit wall registering in said last-named slot.

2. A combination according to claim 1, said body portion having a spring loaded normally open push-button valve mounted between the ends of the body portion positioned to obstruct one of the body portion passages upon manual operation of the valve.

3. A combination according to claim 1, said means comprising a cylindrical portion in said coupling at the intersection of said tubular portion with the coupling nipple, an axial stem rotatably mounted in said cylindrical portion in the plane of said coupling nipple wall, and radial wings extending from said stem at an obtuse angle to each other with the wings normally positioned to divert the inlet water as aforesaid.

References Cited in the file of this patent

UNITED STATES PATENTS

| | | |
|---|---|---|
| 890,709 | Richwood | June 16, 1908 |
| 1,839,768 | Major | Jan. 5, 1932 |
| 2,340,926 | Bradley | Feb. 8, 1944 |
| 2,550,120 | Martin | Apr. 24, 1951 |
| 2,599,911 | Haines | June 10, 1952 |
| 2,717,403 | Batlas | Sept. 13, 1955 |
| 2,806,236 | Stefano | Sept. 17, 1957 |
| 2,887,121 | Magee | May 19, 1959 |
| 2,915,259 | Force | Dec. 1, 1959 |

FOREIGN PATENTS

| | | |
|---|---|---|
| 773,584 | France | Nov. 21, 1934 |